(12) United States Patent
Shen (10) Patent No.: US 11,363,594 B2
(45) Date of Patent: Jun. 14, 2022

(54) TIME-DOMAIN RESOURCE DETERMINATION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 78 days.

(21) Appl. No.: 16/933,733

(22) Filed: Jul. 20, 2020

(65) Prior Publication Data
US 2020/0351875 A1    Nov. 5, 2020

Related U.S. Application Data (63) Continuation of application No. PCT/CN2018/073194, filed on Jan. 18, 2018.

(51) Int. Cl.
*H04W 72/04* (2009.01)
*H04W 76/27* (2018.01)
(Continued)

(52) U.S. Cl.
CPC ..... *H04W 72/0446* (2013.01); *H04W 72/042* (2013.01); *H04W 72/1273* (2013.01); *H04W 76/27* (2018.02); *H04W 80/02* (2013.01)

(58) Field of Classification Search
CPC ........... H04W 72/042; H04W 72/0446; H04W 72/1273; H04W 76/27; H04W 80/02; H04L 25/0226; H04L 5/0048
See application file for complete search history.

(56) References Cited

U.S. PATENT DOCUMENTS

| | | | |
|---|---|---|---|
| 9,882,689 B2 * | 1/2018 | Yu | H04B 7/024 |
| 2013/0294318 A1 * | 11/2013 | Amerga | H04W 4/06 370/312 |

(Continued)

FOREIGN PATENT DOCUMENTS

| | | |
|---|---|---|
| CN | 101425840 | 5/2009 |
| CN | 107371251 | 11/2017 |

(Continued)

OTHER PUBLICATIONS

FIIP, Office Action for RU Application No. 2020127348, dated Jan. 29, 2021.

(Continued)

*Primary Examiner* — Wei Zhao
(74) *Attorney, Agent, or Firm* — Hodgson Russ LLP (57) ABSTRACT

Disclosed are a time-domain resource determination method and apparatus, and a computer storage medium. The method includes: receiving, by a terminal, first indication information sent by a network device, wherein the first indication information is used to indicate whether a first time-domain resource determination rule or a second time-domain resource determination rule is used to determine whether a first time slot is used for transmitting a first channel scheduled by first scheduling information; determining, by the terminal, a time-domain resource determination rule to be used according to the first indication information, and determining at least one time slot for transmitting the first channel based on the determined time-domain resource determination rule; and performing, by the terminal, transmission of the first channel with the network device in the determined at least one time slot.

16 Claims, 5 Drawing Sheets

(51) Int. Cl.
*H04W 72/12* (2009.01)
*H04W 80/02* (2009.01)

(56) References Cited

U.S. PATENT DOCUMENTS

2017/0208621 A1    7/2017  Dutta et al.
2019/0149365 A1*   5/2019  Chatterjee ........... H04L 25/0226
                                                        370/329

FOREIGN PATENT DOCUMENTS

| CN | 107528666 | 12/2017 |
|----|-----------|---------|
| EP | 3171561   | 5/2017  |
| RU | 2632250   | 10/2017 |
| WO | 2017197850 | 11/2017 |

OTHER PUBLICATIONS

WIPO, ISR for PCT/CN2018/073194, Oct. 15, 2018.
ISDEC, Office Action for CA Application No. 3088809, dated Aug. 27, 2021.
EPO, Extended European Search Report for EP Application No. 18900758.6, dated Nov. 20, 2020.
Spreadtrum Communications, The relation among UE-specific DCI, GC-PDCCH, and semi-static signaling, 3GPP TSG RAN WG1 Meeting #90, R1-1713057, Aug. 2017, 4 pages.
OPPO, "Remaining issues on GC-PDCCH," 3GPP TSG RAN WG1 Meeting AH 1801, R1-1800496, Jan. 2018, 7 pages.
Samsung, "Remaining Issues for Multi-Slot Long PUCCH Transmission," 3GPP TSG RAN WG1 Meeting #91, R1-1720331, Nov. 2017, 3 pages.
Ericsson, "On UE Procedures Related to Group-Common PDCCH," 3GPP TSG RAN WG1 NR Ad-Hoc#2, R1-1711485, Jun. 2017, 4 pages.
Intel Corporation, "Remaining details and corrections on GC PDCCH," 3GPP TSG RAN WG1 Meeting AH 1801, R1-1800324, Jan. 2018, 5 pages.
CATT, "Design of multi-slot PUCCH transmission," 3GPP TSG RAN WG1 Meeting 91, R1-1720199, Nov. 2017, 3 pages.
Vivo, "Remaining issues on slot format and GC-PDCCH," 3GPP TSG RAN WG1 Meeting AH 1801, R1-1800197, Jan. 2018, 5 pages.
KIPO, Office Action for KR Application No. 10-2020-7022158, dated Jan. 25, 2022.
JPO, Office Action for JP Application No. 2020-539822, dated Jan. 4, 2022.
IPI, Office Action for IN Application No. 202027032352, dated Nov. 12, 2021.

* cited by examiner

TIME-DOMAIN RESOURCE DETERMINATION METHOD AND APPARATUS, AND COMPUTER STORAGE MEDIUM

CROSS-REFERENCE TO RELATED APPLICATION(S)

This application is a continuation of International Application No. PCT/CN2018/073194, filed Jan. 18, 2018, the entire disclosure of which is incorporated by reference herein.

TECHNICAL FIELD

Embodiments of the present disclosure generally relate to wireless communication technologies, and more particularly, to time-domain resource determination methods and devices, and computer storage mediums.

BACKGROUND

In a Long Term Evolution (LTE) system, the uplink and downlink configurations are determined statically by the frame structure. The scheduling of the time-domain resources for data channels (such as, for example, Physical Downlink Shared Channel (PDSCH), Physical Uplink Shared Channel (PUSCH)) complies with the uplink and downlink configuration of the frame structure.

In the 5th generation (5G, New Radio) system, in order to improve the flexibility of resource allocation and reduce delay, the uplink and downlink configuration of each time slot can be configured semi-statically or even dynamically. Also, in order to improve coverage at the cell edge, 5G NR will support multi-slot scheduling, that is, a base station schedules multiple timeslot resources for the terminal at one time, and improves signal coverage through energy accumulation in the time domain.

In addition, in the 5G NR system, some time slots or symbols can be configured as "undetermined" (or "flexible"), that is, it is temporarily uncertain whether the time slots or symbols are used for downlink or uplink transmission, and the time slots or symbols can be scheduled for downlink or uplink transmission according to actual needs when resource scheduling is performed.

In multi-slot scheduling, in order to limit the overhead of control signaling, each time slot is assigned with same symbols, and a terminal determines whether a time slot contains enough symbols consistent with the transmission direction of resource allocation so as to determine whether the time slot can be used for transmission of multi-slot scheduling. However, as to whether the "undetermined" (or flexible) symbols are used for transmission of multi-slot scheduling, there is no clear-cut solution, and it is contradictory to realize both coverage enhancement and large user capacity in one system.

SUMMARY

In view of the above problems, embodiments of the present disclosure provide a time-domain resource determination method, device, and a computer storage medium.

An embodiment of the present disclosure provides a time-domain resource determination method, including:

receiving, by a terminal, first indication information (e.g., sent by a network device), wherein the first indication information is used to indicate whether a first time-domain resource determination rule or a second time-domain resource determination rule is used to determine whether a first time slot is used for transmitting a first channel scheduled by first scheduling information;

determining, by the terminal, a time-domain resource determination rule to be used according to the first indication information, and determining at least one time slot for transmitting the first channel based on the determined time-domain resource determination rule; and transmitting, by the terminal, the first channel (e.g., with the network device) in the determined at least one time slot.

According to an embodiment of the present disclosure, if the first scheduling information schedules N symbols to be a first transmission direction in at least one time slot, and N is a positive integer, then:

the first time-domain resource determination rule is: if transmission directions of the N symbols in the first time slot are all configured as the first transmission direction, the terminal determines that the first time slot is available for transmission of the first channel;

the second time-domain resource determination rule is: if transmission directions of the N symbols in the first time slot are all configured as the first transmission direction and/or a flexible transmission direction, the terminal determines that the first time slot is available for transmission of the first channel.

According to an embodiment of the present disclosure, the first transmission direction is an uplink transmission direction or a downlink transmission direction.

According to an embodiment of the present disclosure, the method further includes:

acquiring, by the terminal, first configuration information, wherein the first configuration information is used to configure a transmission direction of each symbol in at least one time slot including the first time slot; and determining, by the terminal, transmission directions of the N symbols in the first time slot based on the first configuration information.

According to an embodiment of the present disclosure, the acquiring the first configuration information by the terminal includes:

acquiring, by the terminal, the first configuration information according to pre-configured information; and/or acquiring, by the terminal, the first configuration information from System Information (SI) (e.g., sent by the network device); and/or acquiring, by the terminal, the first configuration information from Radio Resource Control (RRC) signaling (e.g., sent by the network device); and/or acquiring, by the terminal, the first configuration information from Downlink Control Information (DCI) (e.g., sent by the network device).

According to an embodiment of the present disclosure, the receiving, by the terminal, the first indication information (e.g., sent by the network device) includes:

receiving, by the terminal, SI (e.g., sent by the network device), wherein the SI includes the first indication information; or receiving, by the terminal, RRC signaling (e.g., sent by the network device), wherein the RRC includes the first indication information; or receiving, by the terminal, DCI (e.g., sent by the network device), wherein the DCI includes the first indication information; or receiving, by the terminal, a Media Access Control (MAC) Control Element (CE) (e.g., sent by the network device), wherein the MAC CE includes the first indication information.

According to an embodiment of the present disclosure, the first scheduling information is carried in DCI or RRC signaling.

An embodiment of the present disclosure provides a time-domain resource determination method, including:

sending, by a network device, first indication information (e.g., to a terminal), wherein the first indication information is used to indicate whether a first time-domain resource determination rule or a second time-domain resource determination rule is used to determine whether a first time slot is used for transmitting a first channel scheduled by first scheduling information; and transmitting, by the network device, the first channel (e.g., with the terminal) in at least one time slot scheduled by the first scheduling information corresponding to the first indication information.

According to an embodiment of the present disclosure, if the first scheduling information schedules N symbols to be a first transmission direction in the at least one time slot, and N is a positive integer, then:

the first time-domain resource determination rule is: if transmission directions of the N symbols in the first time slot are all configured as the first transmission direction, the terminal determines that the first time slot is available for transmission of the first channel; and the second time-domain resource determination rule is: if transmission directions of the N symbols in the first time slot are all configured as the first transmission direction and/or a flexible transmission direction, the terminal determines that the first time slot is available for transmission of the first channel.

According to an embodiment of the present disclosure, the first transmission direction is an uplink transmission direction or a downlink transmission direction.

According to an embodiment of the present disclosure, the method further includes:

sending, by the network device, first configuration information (e.g., to the terminal), wherein the first configuration information is used to configure a transmission direction of each symbol in at least one time slot including the first time slot.

According to an embodiment of the present disclosure, the sending, by the network device, first configuration information (e.g., to the terminal) includes:

sending, by the network device, System Information (SI) (e.g., to the terminal), wherein the SI includes the first configuration information; and/or sending, by the network device, Radio Resource Control (RRC) (e.g., to the terminal), wherein the RRC includes the first configuration information; and/or sending, by the network device, Downlink Control Information (DCI) (e.g., to the terminal), wherein the DCI includes the first configuration information.

According to an embodiment of the present disclosure, the sending, by a network device, first indication information (e.g., to the terminal) includes:

sending, by the network device, SI (e.g., to the terminal), wherein the SI includes the first indication information; or sending, by the network device, RRC signaling (e.g., to the terminal), wherein the RRC includes the first indication information; or sending, by the network device, DCI (e.g., to the terminal), wherein the DCI includes the first indication information; or sending, by the network device, a Media Access Control (MAC) Control Element (CE) (e.g., to the terminal), wherein the MAC CE includes the first indication information.

According to an embodiment of the present disclosure, the first scheduling information is carried in DCI or RRC signaling.

An embodiment of the present disclosure provides a time-domain resource determination device, including:

a receiving unit configured to receive first indication information sent by a network device, wherein the first indication information is used to indicate whether a first time-domain resource determination rule or a second time-domain resource determination rule is used to determine whether a first time slot is used for transmitting a first channel scheduled by first scheduling information;

a first determination unit configured to determine a time-domain resource determination rule to be used according to the first indication information;

a second determination unit configured to determine at least one time slot for transmitting the first channel based on the determined time-domain resource determination rule; and a transmission unit configured to perform transmission of the first channel with the network device in the determined at least one time slot.

An embodiment of the present disclosure provides a terminal, comprising:

a processor;

a memory configured to store instructions executable by the processor; and a transmission device in communication with the processor; and wherein the processor is configured to:

receive, by way of the transmission device, first indication information, wherein the first indication information is used to indicate whether a first time-domain resource determination rule or a second time-domain resource determination rule is used to determine whether a first time slot is used for transmitting a first channel scheduled by first scheduling information;

determine a time-domain resource determination rule to be used according to the first indication information, determine at least one time slot for transmitting the first channel based on the determined time-domain resource determination rule; and transmit, by way of the transmission device, the first channel (e.g., with the network device) in the determined at least one time slot.

According to an embodiment of the present disclosure, if the first scheduling information schedules N symbols to be a first transmission direction in at least one time slot, and N is a positive integer, then:

the first time-domain resource determination rule is: if transmission directions of the N symbols in the first time slot are all configured as the first transmission direction, the terminal determines that the first time slot is available for transmission of the first channel;

the second time-domain resource determination rule is: if transmission directions of the N symbols in the first time slot are all configured as the first transmission direction and/or a flexible transmission direction, the terminal determines that the first time slot is available for transmission of the first channel.

According to an embodiment of the present disclosure, the first transmission direction is an uplink transmission direction or a downlink transmission direction.

According to an embodiment of the present disclosure, wherein the processor is further configured to:

acquire first configuration information, wherein the first configuration information is used to configure a transmission direction of each symbol in at least one time slot including the first time slot; and determine transmission directions of the N symbols in the first time slot based on the first configuration information.

According to an embodiment of the present disclosure, the processor is further configured to:

acquire the first configuration information according to pre-configured information; and/or acquire the first configuration information from System Information (SI) received by way of the transmission device (e.g., sent by the network device); and/or acquire the first configuration information from Radio Resource Control (RRC) signaling received by way of the transmission device (e.g., sent by the network device); and/or acquire the first configuration information from Downlink Control Information (DCI) received by way of the transmission device (e.g., sent by the network device).

According to an embodiment of the present disclosure, the processor is further configured to:

receive SI received by way of the transmission device (e.g., sent by the network device), wherein the SI includes the first indication information; or receive RRC signaling received by way of the transmission device (e.g., sent by the network device), wherein the RRC includes the first indication information; or receive DCI received by way of the transmission device (e.g., sent by the network device), wherein the DCI includes the first indication information; or receive Media Access Control (MAC) Control Element (CE) received by way of the transmission device (e.g., sent by the network device), wherein the MAC CE includes the first indication information.

According to an embodiment of the present disclosure, the first scheduling information is carried in DCI or RRC signaling.

An embodiment of the present disclosure provides a network device, including:

a processor;

a memory storing instructions executable by the processor;

a transmission device in communication with the processor; and wherein the processor is configured to:

send, by way of the transmission device, first indication information (e.g., to a terminal), wherein the first indication information is used to indicate whether a first time-domain resource determination rule or a second time-domain resource determination rule is used to determine whether a first time slot is used for transmitting a first channel scheduled by first scheduling information; and transmit, by way of the transmission device, the first channel with the terminal in at least one time slot scheduled by the first scheduling information corresponding to the first indication information.

According to an embodiment of the present disclosure, if the first scheduling information schedules N symbols to be a first transmission direction in at least one time slot, and N is a positive integer, then:

the first time-domain resource determination rule is: if transmission directions of the N symbols in the first time slot are all configured as the first transmission direction, the first time slot is available for transmission of the first channel;

the second time-domain resource determination rule is: if transmission directions of the N symbols in the first time slot are all configured as the first transmission direction and/or a flexible transmission direction, the first time slot is available for transmission of the first channel.

According to an embodiment of the present disclosure, the first transmission direction is an uplink transmission direction or a downlink transmission direction.

According to an embodiment of the present disclosure, the processor is further configured to:

send, by way of the transmission device, first configuration information (e.g., to the terminal), wherein the first configuration information is used to configure a transmission direction of each symbol in at least one time slot including the first time slot.

According to an embodiment of the present disclosure, the processor is further configured to:

send System Information (SI) (e.g., to the terminal), wherein the SI includes the first configuration information; and/or send Radio Resource Control (RRC) (e.g., to the terminal), wherein the RRC includes the first configuration information; and/or send Downlink Control Information (DCI) (e.g., to the terminal), wherein the DCI includes the first configuration information.

According to an embodiment of the present disclosure, the processor is further configured to:

send SI (e.g., to the terminal), wherein the SI includes the first indication information; or send RRC signaling (e.g., to the terminal), wherein the RRC includes the first indication information; or send DCI (e.g., to the terminal), wherein the DCI includes the first indication information; or send Media Access Control (MAC) Control Element (CE) (e.g., to the terminal), wherein the MAC CE includes the first indication information.

According to an embodiment of the present disclosure, the first scheduling information is carried in DCI or RRC signaling.

An embodiment of the present disclosure provides a computer storage medium having computer-executable instructions stored thereon, wherein when the computer-executable instructions are executed by a processor, the processor is caused to implement any of the time-domain resource determination methods described above.

In some embodiments of the present disclosure, a terminal receives the first indication information sent by the network device, and the first indication information is used to indicate whether a first time-domain resource determination rule or a second time-domain resource determination rule is used to determine whether a first time slot is used for transmitting a first channel scheduled by first scheduling information. The terminal determines a time-domain resource determination rule to be used according to the first indication information, and determines at least one time slot for transmitting the first channel based on the determined time-domain resource determination rule. The terminal transmits the first channel with the network device in the determined at least one time slot. If the first scheduling information schedules N symbols to be a first transmission direction in at least one time slot, and N is a positive integer, the first time-domain resource determination rule is: if transmission directions of the N symbols in the first time slot are all configured as the first transmission direction, the terminal determines that the first time slot is available for transmission of the first channel; the second time-domain resource determination rule is: if transmission directions of the N symbols in the first time slot are all configured as the first transmission direction and/or a flexible transmission direction, the terminal determines that the first time slot is available for transmission of the first channel. Using the technical solutions according to embodiments of the present disclosure, whether the time-domain resources in the flexible transmission direction (i.e., the flexible symbols or undetermined symbols) are used or not may be determined according to the indication sent from the network device. The technical solutions according to embodiments of the present disclosure can flexibly achieve greater coverage or greater scheduling flexibility for different application scenarios, thereby achieving optimization for various application scenarios, and improving the spectral efficiency of the entire system.

BRIEF DESCRIPTION OF THE DRAWINGS

The drawings described here are used to provide a further understanding of the present disclosure and constitute a part of the present disclosure. The exemplary embodiments of the present disclosure and the descriptions are used to explain the present disclosure, and do not constitute undue limitation on the present disclosure. In the drawings.

DETAILED DESCRIPTION

If flexible symbols (or undetermined symbols) are allowed for transmission of multi-slot scheduling, in order to avoid interference between different transmission directions, terminals in the same cell or in adjacent cells also schedule the same transmission direction on corresponding flexible symbols, which limits the flexibility of scheduling, and is not conducive to achieving high spectral efficiency in scenarios with a large number of terminals.

If flexible symbols (or undetermined symbols) are not allowed for transmission of multi-slot scheduling, the number of time slots that comply with multi-slot scheduling will be greatly reduced, making it difficult to effectively use multi-slot scheduling, and thereby limiting the cell-edge coverage enhancement capabilities.

In view of the above, an embodiment of the present disclosure proposes a time-domain resource determination method, which can use or not use time-domain resources in flexible transmission directions according to the indication sent from a network device, and can flexibly implement greater coverage or greater scheduling flexibility for different application scenarios.

Figure 1:
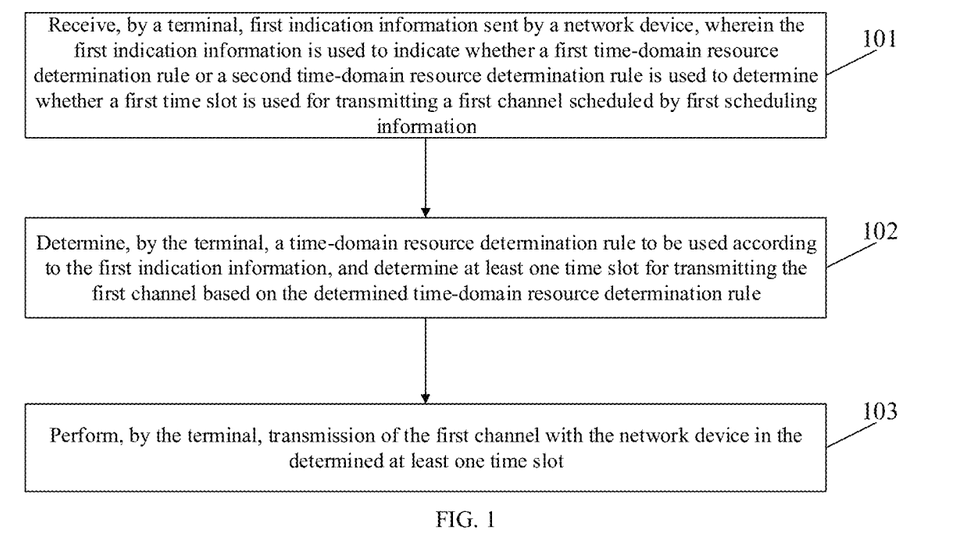
FIG. 1 is a first flowchart of a time-domain resource determination method according to an embodiment of the present disclosure.

FIG. 1 is a first flowchart of a time-domain resource determination method according to an embodiment of the present disclosure. As shown in FIG. 1, the time-domain resource determination method includes the following steps:

In step 101, a terminal receives first indication information, which may be sent by, for example, a network device. The first indication information is used to indicate whether a first time-domain resource determination rule or a second time-domain resource determination rule is used to determine whether a first time slot is used for transmitting a first channel scheduled by first scheduling information.

In an embodiment of the present disclosure, the terminal may be any device that can communicate with a network device, such as, for example, a mobile phone, a tablet computer, a notebook computer, or a desktop computer.

In an embodiment of the present disclosure, the first indication information may be sent by a network device such as, for example, a base station, such as a gNB in a 5G system or an eNB in a 4G system.

In an embodiment of the present disclosure, the receiving by the terminal the first indication information may be implemented in any one of the following ways:

1) The terminal receives SI, and the SI includes the first indication information.

2) The terminal receives RRC signaling, and the RRC includes the first indication information.

3) The terminal receives DCI, and the DCI includes the first indication information.

4) The terminal receives a MAC CE, and the MAC CE includes the first indication information.

In the embodiment of the present disclosure, the first indication information is used to indicate whether a first time-domain resource determination rule or a second time-domain resource determination rule is used to determine whether a first time slot is used for transmitting a first channel scheduled by first scheduling information. For example, the first indication information may be represented by one bit. When the bit is 1, it indicates that the first time-domain resource determination rule is used to determine whether the first time slot is used for transmitting the first channel scheduled by the first scheduling information; when the bit is 0, it indicates that the second time-domain resource determination rule is used to determine whether the first time slot is used for transmitting the first channel scheduled by first scheduling information. In an alternative, when the bit is 1, it indicates that the second time-domain resource determination rule is used to determine whether the first time slot is used for transmitting the first channel scheduled by first scheduling information; when the bit is 0, it indicates that the first time-domain resource determination rule is used to determine whether the first time slot is used for transmitting the first channel scheduled by the first scheduling information.

An exemplary first time-domain resource determination rule and second time-domain resource determination rule are described below.

Assuming that the first scheduling information schedules N symbols to be a first transmission direction in at least one time slot, and N is a positive integer, then:

the first time-domain resource determination rule is: if transmission directions of the N symbols in the first time slot are all configured as the first transmission direction, the terminal determines that the first time slot is available for transmission of the first channel;

the second time-domain resource determination rule is: if transmission directions of the N symbols in the first time slot are all configured as the first transmission direction and/or a flexible transmission direction, the terminal determines that the first time slot is available for transmission of the first channel.

In the above solutions, the first time slot is a general time slot.

For the first time-domain resource determination rule, all transmission directions of N symbols in a certain time slot need to be configured as the first transmission direction (that is, the transmission direction of the first channel scheduled by the first scheduling information), it can be seen that flexible symbols cannot be used as resources for multi-slot scheduling.

As for the second time-domain resource determination rule, there are the following three cases:

Case 1: The transmission directions of the N symbols in a certain time slot are all configured as the first transmission direction (that is, the transmission direction of the first channel scheduled by the first scheduling information).

Case 2: The transmission directions of the N symbols in a certain time slot are all configured as the flexible transmission direction (that is, the N symbols are flexible symbols and can be used for uplink or downlink scheduling).

Case 3: A part of the transmission directions of the N symbols in a certain time slot are configured as the first transmission direction, and the rest are all configured as the flexible transmission direction.

It can be seen that flexible symbols can be used as resources for multi-slot scheduling.

In an embodiment of the present disclosure, the first transmission direction is an uplink transmission direction or a downlink transmission direction.

In an embodiment of the present disclosure, the first scheduling information is carried in DCI or RRC signaling.

In an embodiment of the present disclosure, the terminal determines transmission directions of the N symbols in the first time slot in the following manner:

The terminal obtains first configuration information, and the first configuration information is used to configure a transmission direction of each symbol in at least one time slot including the first time slot; the terminal determines transmission directions of the N symbols in the first time slot based on the first configuration information.

In an embodiment, the terminal obtains the first configuration information according to pre-configured information.

In an embodiment, the terminal obtains the first configuration information from SI. The SI may be sent by the network device.

In an embodiment, the terminal obtains the first configuration information from RRC signaling. The RRC signaling may be sent by the network device.

In an implementation manner, the terminal obtains the first configuration information from Downlink Control Information (DCI). The DCI may be sent by the network device.

In an embodiment, the terminal may determine the first configuration information according to any combination of SI, RRC signaling, and DCI.

In step 102, the terminal determines a time-domain resource determination rule to be used according to the first indication information, and determines at least one time slot for transmitting the first channel based on the determined time-domain resource determination rule.

In step 103, the terminal transmits the first channel with the network device in the determined at least one time slot.

In an embodiment of the present disclosure, the terminal transmits the first channel (e.g., with the network device) in the determined at least one time slot includes the following two cases:

1) Uplink transmission: the terminal sends the first channel (e.g., to the network device) in the determined at least one time slot.

2) Downlink transmission: the terminal receives the first channel (e.g., sent by the network device) in the determined at least one time slot.

In embodiments of the present disclosure, optimization can be made separately for various application scenarios, and the spectral efficiency of the entire system can be improved. For example, in an urban scenario, there are a large number of users in a cell, but the cell radius is small, and a strong coverage capability is not required. Under such condition, a first time-domain resource determination rule may be used. For another example, in a suburban scenario, the number of users in a cell is small, but the cell radius is large, and strong coverage capabilities are required. Under such condition, a second time-domain resource determination rule may be used.

Figure 2:
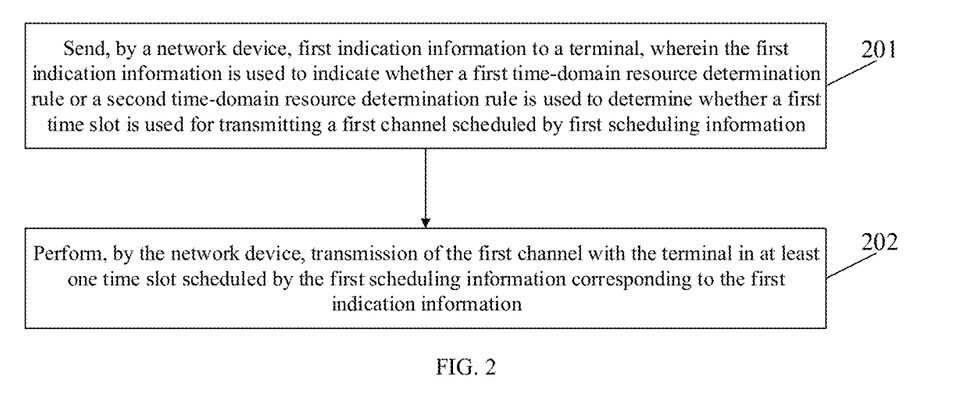
FIG. 2 is a second flowchart of a time-domain resource determination method according to an embodiment of the present disclosure.

FIG. 2 is a flowchart of a time-domain resource determination method according to another embodiment of the present disclosure. As shown in FIG. 2, the time-domain resource determination method may include the following steps:

In step 201, a network device sends first indication information (e.g., to a terminal). The first indication information is used to indicate whether a first time-domain resource determination rule or a second time-domain resource determination rule is used to determine whether a first time slot is used for transmitting a first channel scheduled by first scheduling information.

In an embodiment of the present disclosure, the terminal may be any device that can communicate with the network device, such as, for example, a mobile phone, a tablet computer, a notebook computer, or a desktop computer.

In an embodiment of the present disclosure, the network device may be a base station, such as, for example, a gNB in a 5G system or an eNB in a 4G system.

In an embodiment of the present disclosure, the network device sending the first indication information may be implemented in any one of the following ways:

1) The network device sends SI (e.g., to the terminal), and the SI includes the first indication information.

2) The network device sends RRC signaling (e.g., to the terminal), and the RRC includes the first indication information.

3) The network device sends a DCI (e.g., to the terminal), and the DCI includes the first indication information.

4) The network device sends a MAC CE (e.g., to the terminal), and the MAC CE includes the first indication information.

In an embodiment of the present disclosure, the first indication information is used to indicate whether a first time-domain resource determination rule or a second time-domain resource determination rule is used to determine whether a first time slot is used for transmitting a first channel scheduled by first scheduling information. Assuming that the first scheduling information schedules N symbols to be a first transmission direction in at least one slot, and N is a positive integer, then:

the first time-domain resource determination rule is: if transmission directions of the N symbols in the first time slot are all configured as the first transmission direction, the terminal determines that the first time slot can be used for transmission of the first channel;

the second time-domain resource determination rule is: if transmission directions of the N symbols in the first time slot are all configured as the first transmission direction and/or a flexible transmission direction, the terminal determines that the first time slot can be used for transmission of the first channel.

In an embodiment of the present disclosure, the first transmission direction is an uplink transmission direction or a downlink transmission direction.

In an embodiment of the present disclosure, the first scheduling information is carried in DCI or RRC signaling.

In an embodiment of the present disclosure, in order to let a terminal know the transmission directions of the N symbols in the first time slot, the network device sends first configuration information to the terminal. The first configuration information is used to configure a transmission direction of each symbol in at least one time slot including the first time slot.

In an embodiment of the present disclosure, the sending, by the network device, the first configuration information to the terminal includes:

sending, by the network device, System Information (SI) to the terminal, wherein the SI includes the first configuration information; and/or sending, by the network device, Radio Resource Control (RRC) to the terminal, wherein the RRC includes the first configuration information; and/or sending, by the network device, Downlink Control Information (DCI) to the terminal, wherein the DCI includes the first configuration information.

In step 202, the network device transmits the first channel with the terminal in at least one time slot scheduled by the first scheduling information corresponding to the first indication information.

In an embodiment of the present disclosure, the network device performing transmission of the first channel with the terminal in at least one time slot scheduled by the first scheduling information corresponding to the first indication information includes the following two cases:

1) Uplink transmission: the network device receives the first channel sent by the terminal in at least one time slot scheduled by the first scheduling information corresponding to the first indication information.

2) Downlink transmission: the network device sends the first channel to the terminal in at least one time slot scheduled by the first scheduling information corresponding to the first indication information.

The technical solutions of embodiments of the present disclosure are described in further detail below with examples.

Figure 3:
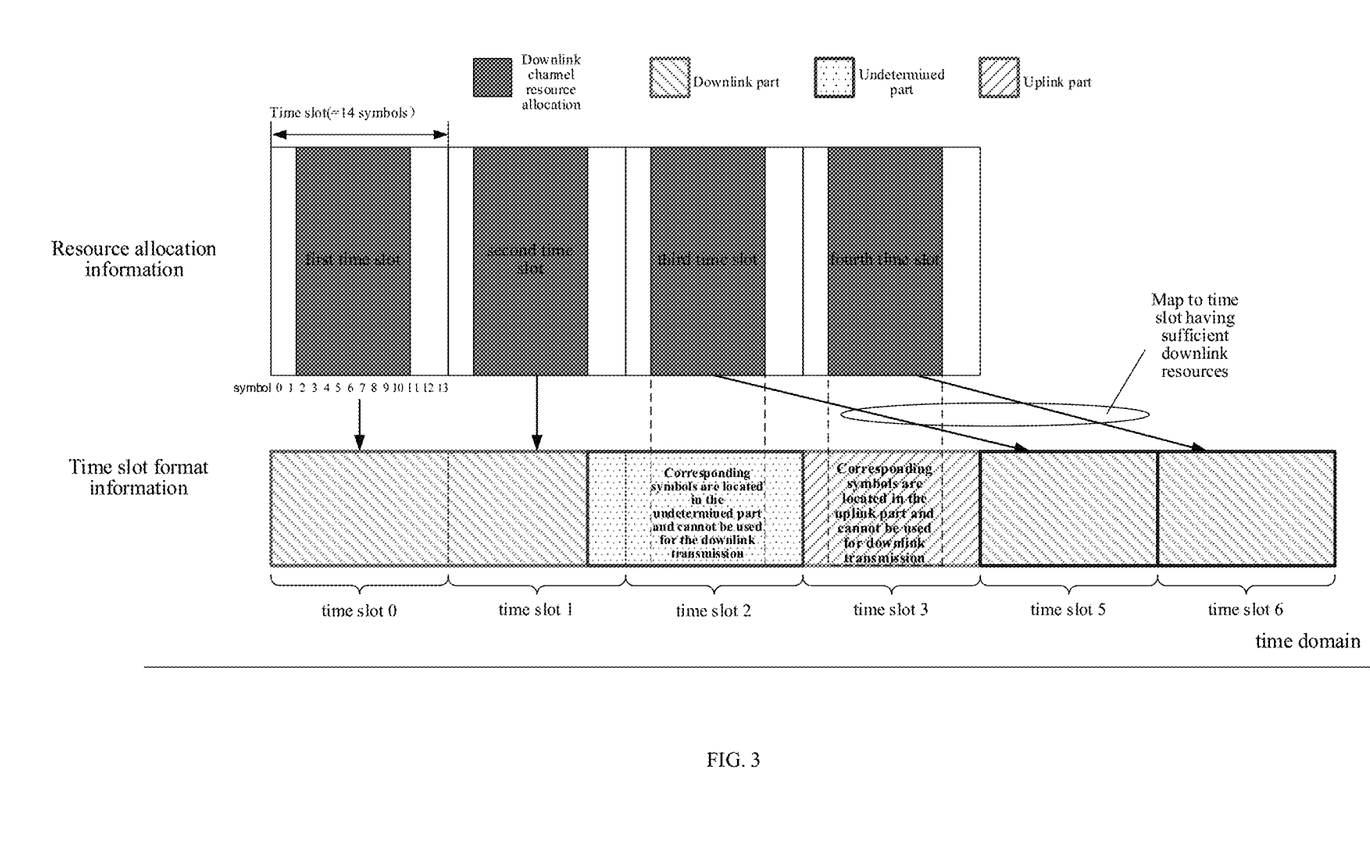
FIG. 3 is a schematic diagram of resource scheduling for a first time-domain resource determination rule according to an embodiment of the present disclosure.

Example 1: Determining Whether the First Time Slot is Used for Transmission of the First Channel Scheduled by the First Scheduling Information Using the First Time-Domain Resource Determination Rule Referring to FIG. 3, the first channel is a downlink channel. The network device schedules 4 time slots for the terminal for transmission of the first channel. A part of symbols (symbols 2-10 in FIG. 3) in each time slot are scheduled for transmission of the first channel. Based on the first time-domain resource determination rule, only time slots in which symbols 2-10 are downlink symbols can be used for transmission of the first channel. In the example in FIG. 3, symbols 2 to 10 in time slot 0 and time slot 1 are downlink symbols, and meet the requirements, while symbols 2 to 10 in time slot 2 are undetermined symbols and do not meet the requirements. The symbols 2 to 10 in time slot 3 are uplink symbols and do not meet the requirements. Therefore, time slot 0 and time slot 1 can be used for transmission of the first channel, and the last two time slots scheduled to the first channel can only be mapped to subsequent time slots with sufficient downlink resources, that is, time slots 5 and 6.

Figure 4:
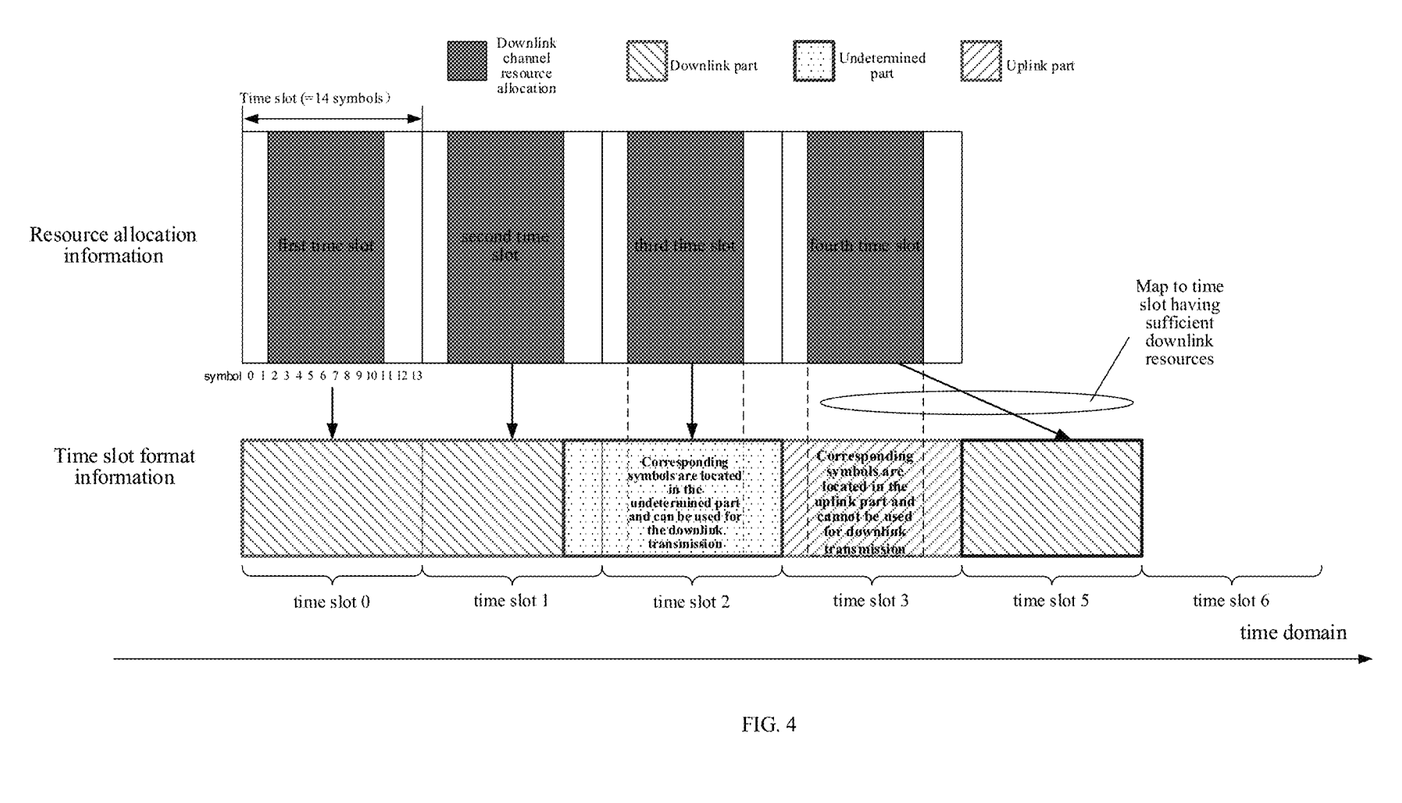
FIG. 4 is a schematic diagram of resource scheduling for a second time-domain resource determination rule according to an embodiment of the present disclosure.

Example 2: Determining Whether the First Time Slot is Used for Transmission of the First Channel Scheduled by the First Scheduling Information Using the Second Time-Domain Resource Determination Rule Referring to FIG. 4, the first channel is a downlink channel. The network device schedules 4 time slots for the terminal for transmission of the first channel. A part of symbols (symbols 2-10 in FIG. 4) in each time slot are scheduled for transmission of the first channel. Based on the second time-domain resource determination rule, only time slots in which symbols 2-10 are downlink symbols and/or undetermined symbols can be used for the transmission of the first channel. In the example of FIG. 4, symbols 2-10 in times lots 0 and 1 are downlink symbols and meet the requirements. Symbols 2-10 in time slot 2 are undetermined symbols and meet the requirements. Symbols 2-10 in time slot 3 are uplink symbols and do not meet the requirements. Therefore, time slot 0, time slot 1, and time slot 2 can be used for the transmission of the first channel, and the last time slot scheduled to the first channel can only be mapped to a subsequent time slot with sufficient downlink resources, that is, time slot 5.

Figure 5:
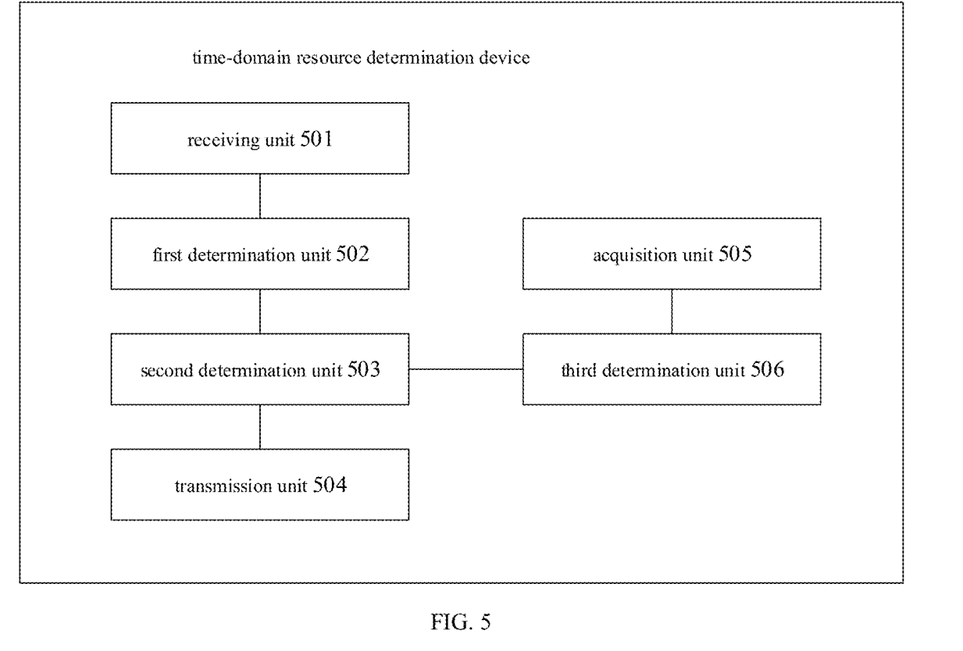
FIG. 5 is a first schematic structural diagram of a time-domain resource determination device according to an embodiment of the present disclosure.

FIG. 5 is a first schematic structural diagram of a time-domain resource determination device according to an embodiment of the present disclosure. The time-domain resource determination device in the embodiment may be applied in a terminal side. As shown in FIG. 5, the time-domain resource determination device includes a receiving unit 501, a first determination unit 502, a second determination unit 503 and a transmission unit 504.

The receiving unit 501 is configured to receive first indication information sent by a network device. The first indication information is used to indicate whether a first time-domain resource determination rule or a second time-domain resource determination rule is used to determine whether a first time slot is used for transmitting a first channel scheduled by first scheduling information.

The first determination unit 502 is configured to determine a time-domain resource determination rule to be used according to the first indication information.

The second determination unit 503 is configured to determine at least one time slot for transmitting the first channel based on the determined time-domain resource determination rule.

The transmission unit 504 is configured to transmit the first channel with the network device in the determined at least one time slot.

According to an embodiment, if the first scheduling information schedules N symbols to be a first transmission direction in at least one time slot, and N is a positive integer, then:

the first time-domain resource determination rule is: if transmission directions of the N symbols in the first time slot are all configured as the first transmission direction, the terminal determines that the first time slot is available for transmission of the first channel;

the second time-domain resource determination rule is: if transmission directions of the N symbols in the first time slot are all configured as the first transmission direction and/or a flexible transmission direction, the terminal determines that the first time slot is available for transmission of the first channel.

According to an embodiment, the first transmission direction is an uplink transmission direction or a downlink transmission direction.

According to an embodiment, the device further includes an acquisition unit 505 and a third determination unit 506.

The acquisition unit 505 is configured to acquire first configuration information, wherein the first configuration information is used to configure a transmission direction of each symbol in at least one time slot including the first time slot.

The third determination unit 506 is configured to determine transmission directions of the N symbols in the first time slot based on the first configuration information.

According to an embodiment, the acquisition unit 505 is configured to:

acquire the first configuration information according to pre-configured information; and/or acquire the first configuration information from System Information (SI) sent by the network device; and/or acquire the first configuration information from Radio Resource Control (RRC) signaling sent by the network device; and/or acquire the first configuration information from Downlink Control Information (DCI) sent by the network device.

According to an embodiment, the receiving unit 501 is configured to:

receive SI sent by the network device, wherein the SI includes the first indication information; or receive RRC signaling sent by the network device, wherein the RRC includes the first indication information; or receive DCI sent by the network device, wherein the DCI includes the first indication information; or receive Media Access Control (MAC) Control Element (CE) sent by the network device, wherein the MAC CE includes the first indication information.

According to an embodiment, the first scheduling information is carried in DCI or RRC signaling.

Those skilled in the art should understand that the functions of the units in the time-domain resource determination device shown in FIG. 5 can be understood by referring to the related descriptions of the foregoing time-domain resource determination methods. The functions of the units in the time domain resource determining device shown in FIG. 5 may be implemented by programs running on a processor. A suitable processor may be implemented in any way, such as, for example, a microprocessor (MCU, Micro Controller Unit), an Application-Specific Integrated Circuit (ASIC), a Field-Programmable Gate Array (FPGA), or by one or more logic circuits (e.g., using discrete components).

Figure 6:
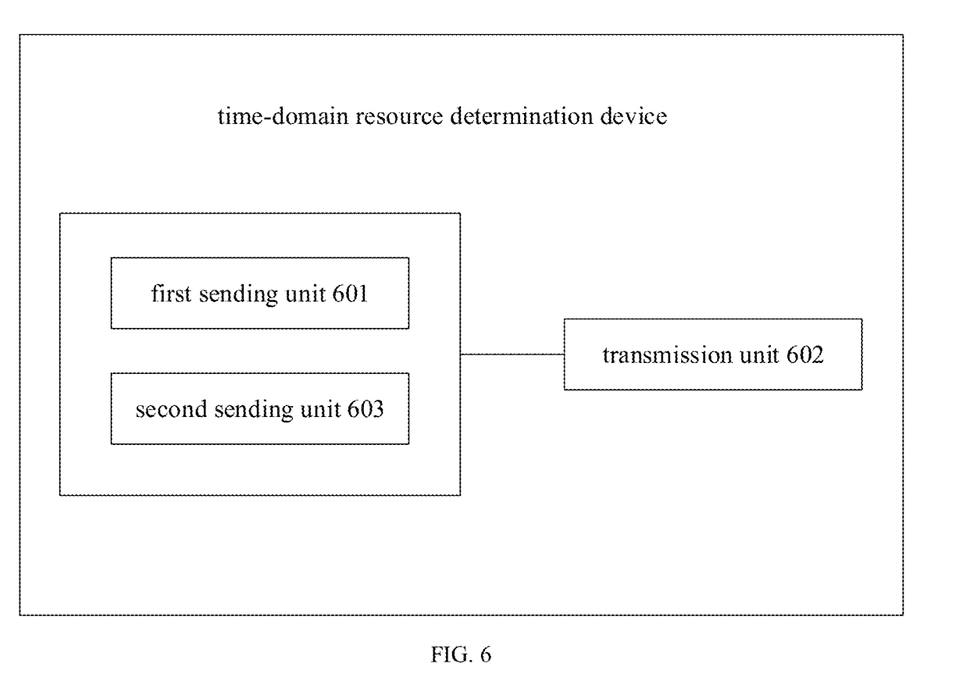
FIG. 6 is a second schematic structural diagram of a time-domain resource determination device according to an embodiment of the present disclosure.

FIG. 6 is a second schematic structural diagram of a time-domain resource determination device according to an embodiment of the present disclosure. The time-domain resource determination device is applied in a network device side. As shown in FIG. 6, the time-domain resource determination device includes a first sending unit 601 and a transmission unit 602.

The first sending unit 601 is configured to send first indication information to a terminal. The first indication information is used to indicate whether a first time-domain resource determination rule or a second time-domain resource determination rule is used to determine whether a first time slot is used for transmitting a first channel scheduled by first scheduling information.

The transmission unit 602 is configured to perform transmission of the first channel with the terminal in at least one time slot scheduled by the first scheduling information corresponding to the first indication information.

According to an embodiment, if the first scheduling information schedules N symbols to be a first transmission direction in at least one time slot, and N is a positive integer, then:

the first time-domain resource determination rule is: if transmission directions of the N symbols in the first time slot are all configured as the first transmission direction, the terminal determines that the first time slot is available for transmission of the first channel;

the second time-domain resource determination rule is: if transmission directions of the N symbols in the first time slot are all configured as the first transmission direction and/or a flexible transmission direction, the terminal determines that the first time slot is available for transmission of the first channel.

According to an embodiment, the first transmission direction is an uplink transmission direction or a downlink transmission direction.

According to an embodiment, the device further includes a second sending unit 603.

The second sending unit 603 is configured to send first configuration information to the terminal. The first configuration information is used to configure a transmission direction of each symbol in at least one time slot including the first time slot.

According to an embodiment, the second sending unit 603 is configured to:

send System Information (SI) to the terminal, wherein the SI includes the first configuration information; and/or send Radio Resource Control (RRC) to the terminal, wherein the RRC includes the first configuration information; and/or send Downlink Control Information (DCI) to the terminal, wherein the DCI includes the first configuration information.

According to an embodiment, the first sending unit 601 is configured to:

send SI to the terminal, wherein the SI includes the first indication information; or send RRC signaling to the terminal, wherein the RRC includes the first indication information; or send DCI to the terminal, wherein the DCI includes the first indication information; or send Media Access Control (MAC) Control Element (CE) to the terminal, wherein the MAC CE includes the first indication information.

According to an embodiment, the first scheduling information is carried in DCI or RRC signaling.

Those skilled in the art should understand that the functions of the units in the time-domain resource determination device shown in FIG. 6 can be understood by referring to the related descriptions of the foregoing time-domain resource determination methods. The functions of the units in the time domain resource determining device shown in FIG. 6 may be implemented by programs running on a processor. A suitable processor may be implemented in any way, such as, for example, a microprocessor (MCU, Micro Controller Unit), an Application-Specific Integrated Circuit (ASIC), a Field-Programmable Gate Array (FPGA), or by one or more logic circuits (e.g., using discrete components).

In embodiments of the present disclosure, if the time-domain resource determination device is implemented in the form of a software functional module and sold or used as an independent product, it may also be stored in a computer-readable storage medium. Based on such an understanding, the technical solutions of the embodiments of the present disclosure that are essential or contribute to the existing technologies can be embodied in the form of software products. The computer software product is stored in a storage medium and includes several instructions to cause a computer device (which may be a personal computer, a server, or a network device) to perform all or part of the methods described in the embodiments of the present disclosure. The storage medium includes various mediums that can store program codes, such as, for example, a U disk, a mobile hard disk, a read only memory (ROM), a magnetic disk, or an optical disk. In this way, the embodiments of the present disclosure are not limited to any specific combination of hardware and software.

An embodiment of the present disclosure further provides a computer storage medium in which computer-executable instructions are stored. When the computer-executable instructions are executed by a processor, the processor is caused to implement the time-domain resource determination methods according to embodiments of the present disclosure.

Figure 7:
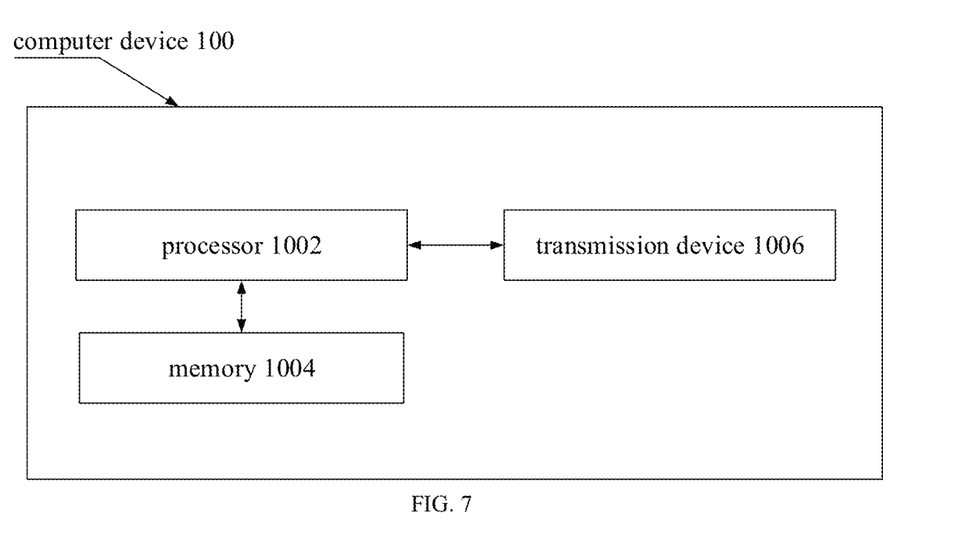
FIG. 7 is a schematic structural diagram of a computer device according to an embodiment of the present disclosure.

FIG. 7 is a schematic structural diagram of a computer device according to an embodiment of the present disclosure. The computer device may be a terminal or a network device. As shown in FIG. 7, the computer device 100 may include one or more (only one shown in the figure) processors 1002, a memory 1004 for storing data, and a transmission device 1006 for performing a communication function. The processor(s) 1002 may include but are not limited to a microprocessor (MCU, Micro Controller Unit), an Application-Specific Integrated Circuit (ASIC), a Field-Programmable Gate Array (FPGA), or by one or more logic circuits (e.g., using discrete components). A person of ordinary skill in the art can understand that the structure shown in FIG. 7 is only schematic, and it does not limit the structure of the electronic device. For example, the computer device 100 may also include more or fewer components than those shown in FIG. 7, or have a different configuration from that shown in FIG. 7.

The memory 1004 may be used to store software programs and modules of application software, such as, for example, program instructions/modules corresponding to the methods in the embodiments of the present disclosure. The one or more processors 1002 implement various functional applications and data processing by running the software programs and modules stored in the memory 1004, i.e., to implement the methods described above. The memory 1004 may include a high-speed random access memory, and may further include a non-volatile memory, such as, for example, one or more magnetic storage devices, flash memory, or other non-volatile solid-state memory. In some examples, the memory 1004 may further include memories remotely set with respect to the processor 1002, and these remote memories may be connected to the computer device 100 through a network. Examples of the above network include, but are not limited to, the Internet, an intranet, a local area network, a mobile communication network, and any combinations thereof.

The transmission device 1006 is used for receiving or transmitting data via a network. The examples of the network may include a wireless network provided by a communication provider of the computer device 100. In one example, the transmission device 1006 includes a network adapter (NIC, Network Interface Controller), which can be connected to other network devices through a base station so as to communicate with the Internet. In one example, the transmission device 1006 may be a radio frequency (RF) module, which is used to communicate with the Internet in a wireless manner.

The technical solutions described in the embodiments of the present disclosure can be arbitrarily combined if such combination will not result in conflict.

In the embodiments provided by the present disclosure, it should be understood that the disclosed methods and smart devices may be implemented in other ways. The device embodiments described above are only schematic. For example, the division of the units is only a logical function division. In actual implementations, there may be another division manner, such as, for example, multiple units or components may be combined, or can be integrated into another system, or some features can be ignored or not implemented. In addition, the coupling, direct coupling, or communication connection between the shown or discussed components may be realized through some interfaces. The indirect coupling or communication connection of the devices or units may be electrical, mechanical, or in other forms.

The units described above as separate components may or may not be physically separated, and the components shown as units may or may not be physical units, which may be located in one place or distributed over multiple network units. Some or all of the units may be selected according to actual needs to achieve the objectives of the solutions of the embodiments.

In addition, functional units in embodiments of the present disclosure may be integrated into a second processing unit, or each unit may be separately used as a unit, or two or more units may be integrated into one unit. The above integrated unit may be implemented in the form of hardware, or in the form of hardware plus software functional units.

The above are only exemplary embodiments of the present disclosure, but the scope of protection of the present disclosure is not limited to this. Any person skilled in the art can easily think of changes or replacements within the technical scope disclosed by the present disclosure, and such changes or replacements fall within the scope of the present disclosure.

What is claimed is:

1. A time-domain resource determination method, comprising:
   receiving, by a terminal, first indication information sent from a network device, wherein the first indication information is used to indicate whether a first time-domain resource determination rule or a second time-domain resource determination rule is used to determine whether a first time slot is used for transmitting a first channel scheduled by first scheduling information;
   determining, by the terminal, a time-domain resource determination rule to be used according to the first indication information, and determining at least one time slot for transmitting the first channel based on the determined time-domain resource determination rule; and transmitting, by the terminal, the first channel in the determined at least one time slot;

wherein in response to that the first scheduling information schedules N symbols to be a first transmission direction in at least one time slot, and N is a positive integer, then:

the first time-domain resource determination rule is: in response to that transmission directions of the N symbols in the first time slot are all configured as the first transmission direction, the terminal determines that the first time slot is available for transmission of the first channel; and the second time-domain resource determination rule is: in response to that transmission directions of the N symbols in the first time slot are all configured as the first transmission direction and/or a flexible transmission direction, the terminal determines that the first time slot is available for transmission of the first channel.

2. The method according to claim 1, further comprising:

acquiring, by the terminal, first configuration information, wherein the first configuration information is used to configure a transmission direction of each symbol in at least one time slot comprising the first time slot; and determining, by the terminal, transmission directions of the N symbols in the first time slot based on the first configuration information.

3. The method according to claim 2, wherein the acquiring the first configuration information by the terminal comprises:

acquiring, by the terminal, the first configuration information according to pre-configured information; and/or acquiring, by the terminal, the first configuration information from System Information (SI); and/or acquiring, by the terminal, the first configuration information from Radio Resource Control (RRC) signaling; and/or acquiring, by the terminal, the first configuration information from Downlink Control Information (DCI).

4. A time-domain resource determination method, comprising:

sending, by a network device, first indication information to a terminal, wherein the first indication information is used to indicate whether a first time-domain resource determination rule or a second time-domain resource determination rule is used to determine whether a first time slot is used for transmitting a first channel scheduled by first scheduling information; and transmitting, by the network device, the first channel in at least one time slot scheduled by the first scheduling information corresponding to the first indication information;

wherein in response to that the first scheduling information schedules N symbols to be a first transmission direction in the at least one time slot, and N is a positive integer, then:

the first time-domain resource determination rule is: in response to that transmission directions of the N symbols in the first time slot are all configured as the first transmission direction, the terminal determines that the first time slot is available for transmission of the first channel; and the second time-domain resource determination rule is: in response to that transmission directions of the N symbols in the first time slot are all configured as the first transmission direction and/or a flexible transmission direction, the terminal determines that the first time slot is available for transmission of the first channel.

5. The method according to claim 4, further comprising:

sending, by the network device, first configuration information, wherein the first configuration information is used to configure a transmission direction of each symbol in at least one time slot comprising the first time slot.

6. The method according to claim 5, wherein the sending, by the network device, first configuration information comprises:

sending, by the network device, System Information (SI), wherein the SI comprises the first configuration information; and/or sending, by the network device, Radio Resource Control (RRC), wherein the RRC comprises the first configuration information; and/or sending, by the network device, Downlink Control Information (DCI), wherein the DCI comprises the first configuration information.

7. A terminal device in communication, comprising:

a processor; and a memory configured to store instructions executable by the processor;

wherein the processor is configured to:

obtain a first indication information from a network device, wherein the first indication information is used to indicate whether a first time-domain resource determination rule or a second time-domain resource determination rule is used to determine whether a first time slot is used for transmitting a first channel scheduled by first scheduling information;

determine a time-domain resource determination rule to be used according to the first indication information, determine at least one time slot for transmitting the first channel based on the determined time-domain resource determination rule; and output the first channel in the determined at least one time slot;

wherein in response to that the first scheduling information schedules N symbols to be a first transmission direction in at least one time slot, and N is a positive integer, then:

the first time-domain resource determination rule is: in response to that transmission directions of the N symbols in the first time slot are all configured as the first transmission direction, the terminal determines that the first time slot is available for transmission of the first channel; and the second time-domain resource determination rule is: in response to that transmission directions of the N symbols in the first time slot are all configured as the first transmission direction and/or a flexible transmission direction, the terminal determines that the first time slot is available for transmission of the first channel.

8. The terminal device according to claim 7, wherein the first transmission direction is an uplink transmission direction or a downlink transmission direction.

9. The terminal device according to claim 7, wherein the processor is further configured to: acquire first configuration information, wherein the first configuration information is used to configure a transmission direction of each symbol in at least one time slot comprising the first time slot; and determine transmission directions of the N symbols in the first time slot based on the first configuration information.

10. The terminal device according to claim 9, wherein the processor is further configured to: acquire the first configuration information according to pre-configured information; and/or acquire the first configuration information from System Information (SI); and/or acquire the first configuration information from Radio Resource Control (RRC) signaling; and/or acquire the first configuration information from Downlink Control Information (DCI).

11. The terminal device according to claim 7, wherein the processor is further configured to: obtain SI, wherein the SI comprises the first indication information; or obtain RRC signaling, wherein the RRC signaling comprises the first indication information; or obtain DCI, wherein the DCI comprises the first indication information; or obtain Media Access Control (MAC) Control Element (CE), wherein the MAC CE comprises the first indication information.

12. The terminal device according to claim 7, wherein the first scheduling information is carried in DCI or RRC signaling.

13. A network device, comprising:
a processor; and
a memory storing instructions executable by the processor;
wherein the processor is configured to:
output a first indication information to a terminal, wherein the first indication information is used to indicate whether a first time-domain resource determination rule or a second time-domain resource determination rule is used to determine whether a first time slot is used for transmitting a first channel scheduled by first scheduling information; and
perform transmission of the first channel in at least one time slot scheduled by the first scheduling information corresponding to the first indication information;

wherein in response to that the first scheduling information schedules N symbols to be a first transmission direction in at least one time slot, and N is a positive integer, then:
the first time-domain resource determination rule is: in response to that transmission directions of the N symbols in the first time slot are all configured as the first transmission direction, the first time slot is available for transmission of the first channel; and
the second time-domain resource determination rule is: in response to that transmission directions of the N symbols in the first time slot are all configured as the first transmission direction and/or a flexible transmission direction, the first time slot is available for transmission of the first channel.

14. The network device according to claim 13, wherein the first transmission direction is an uplink transmission direction or a downlink transmission direction.

15. The network device according to claim 13, wherein the processor is further configured to output first configuration information, wherein the first configuration information is used to configure a transmission direction of each symbol in at least one time slot comprising the first time slot.

16. The network device according to claim 13, wherein the first scheduling information is carried in DCI or RRC signaling.

* * * * *